US009235301B2

(12) United States Patent  
Mo et al.

(10) Patent No.: US 9,235,301 B2  
(45) Date of Patent: Jan. 12, 2016

(54) TOUCH-CONTROL METHOD FOR LIQUID DISPLAY DEVICE AND TOUCH-CONTROLLABLE LIQUID CRYSTAL DISPLAY DEVICE

(71) Applicant: FocalTech Systems, Ltd., George Town, Grand Cayman (KY)

(72) Inventors: Lianghua Mo, Guangdong (CN); Xinxi Jiang, Guangdong (CN); Hua Li, Guangdong (CN); Peng Wang, Guangdong (CN)

(73) Assignee: FOCALTECH ELECTRONICS, LTD., Grand Cayman (KY)

( * ) Notice: Subject to any disclaimer, the term of this patent is extended or adjusted under 35 U.S.C. 154(b) by 180 days.

(21) Appl. No.: 13/936,037

(22) Filed: Jul. 5, 2013

(65) Prior Publication Data

US 2014/0285464 A1    Sep. 25, 2014

(30) Foreign Application Priority Data

Mar. 20, 2013  (CN) .......................... 2013 1 0090330

(51) Int. Cl.  
G06F 3/044 (2006.01)  
G06F 3/041 (2006.01)  
G06F 3/00 (2006.01)  
G06F 3/0354 (2013.01)

(52) U.S. Cl.  
CPC  G06F 3/044 (2013.01); G06F 3/00 (2013.01); G06F 3/03545 (2013.01); G06F 3/0412 (2013.01); G06F 3/0416 (2013.01)

(58) Field of Classification Search  
CPC .... G06F 3/044; G06F 3/03545; G06F 3/0412  
See application file for complete search history.

(56) References Cited

U.S. PATENT DOCUMENTS

| 2011/0254802 | A1 | 10/2011 | Philipp |
| 2012/0062499 | A1* | 3/2012 | Weaver et al. ................. 345/174 |
| 2012/0105362 | A1* | 5/2012 | Kremin et al. ................. 345/174 |
| 2012/0268423 | A1* | 10/2012 | Hotelling et al. ............. 345/174 |
| 2013/0241868 | A1* | 9/2013 | Kim ..................... G09G 3/3685 |
| | | | 345/174 |

FOREIGN PATENT DOCUMENTS

| CN | 101819484 | 9/2010 |
| CN | 102112951 | 6/2011 |
| CN | 102436333 | 5/2012 |
| CN | 102566800 | 7/2012 |
| TW | 201232331 | 8/2012 |

* cited by examiner

Primary Examiner — Koosha Sharifi-Tafreshi  
Assistant Examiner — Chun-Nan Lin  
(74) Attorney, Agent, or Firm — Workman Nydegger

(57) ABSTRACT

A touch-control method for a liquid crystal display device, includes: switching from a display mode to a touch-control mode; determining whether there is a touch made by an object or whether there is an input made by an active pen; in the case where there is the input made by the active pen, starting an active pen detecting sub-mode in which an X-axis direction common electrode of the liquid crystal display device is defined as an X-axis direction receiving electrode, and a Y-axis direction common electrode or a signal electrode is defined as a Y-axis direction receiving electrode; and determining a position or an action of the active pen according to amplitudes of signals of the X-axis direction receiving electrode and the Y-axis direction receiving electrode. A touch-controllable liquid crystal display device is further provided.

10 Claims, 17 Drawing Sheets

TOUCH-CONTROL METHOD FOR LIQUID DISPLAY DEVICE AND TOUCH-CONTROLLABLE LIQUID CRYSTAL DISPLAY DEVICE

CROSS REFERENCE TO RELATED APPLICATION

This application claims the benefit of priority to Chinese Patent Application No.201310090330.X, entitled "TOUCH-CONTROL METHOD FOR LIQUID DISPLAY DEVICE AND TOUCH-CONTROLLABLE LIQUID CRYSTAL DISPLAY DEVICE", filed on Mar. 30, 2013 with State Intellectual Property Office of PRC, which is incorporated herein by reference in its entirety.

FIELD OF THE INVENTION

The present invention generally relates to the field of display technique, and in particular to a touch-control method for a liquid crystal display device and a touch-controllable liquid crystal display device.

BACKGROUND OF THE INVENTION

Currently, there are the following common touch-control technologies.

One touch-control technology is mutual capacitance touch sensing technology. As shown in FIG. 1, a touch is determined based on the mutual capacitance by detecting a coupling capacitance between a driving electrode and a receiving electrode. In the case where there is a touch made by a finger, the coupling capacitance $Cm1$ between the driving electrode and the receiving electrode becomes smaller than the coupling capacitance $Cm0$ in the case where there is not any touch made by the finger, since the finger may absorb some of the electrical field lines. Thereby, a touch is detected according to that change.

Another touch-control technology is active pen input technology. As shown in FIGS. 2 and 3, the principle of the technology is similar to that of the mutual capacitance touch sensing technology. In the active pen input mode, the active pen is used as the driving electrode and may emit a driving signal. Receiving electrodes intersecting with each other in the touch screen receive the signal from the active pen. When the distance between the active pen and the receiving electrode changes, the coupling capacitance between the active pen and the receiving electrode may also change, and the signal received by the receiving electrode may also change. The position of the pen may be determined by analyzing the signals of the electrodes.

Yet another touch-control technology is In-cell technology. As shown in FIG. 4, the touch-control function and the display function are combined together by integrating the touch-control unit into the pixel of the liquid crystal display device.

In the first two technologies mentioned above, the liquid crystal display device and the touch-control panel are separated. Therefore, the thickness and weight of the product may be increased, which goes against a lighter and thinner product. Moreover, the touch panel may affect the light transmittance and deteriorate the display effect. In the In-cell technology, a layer of touch-control sensing units is embedded into the pixels of the liquid crystal display device. However, the embedded sensing unit may reduce the display area and therefore may deteriorate the display effect.

SUMMARY OF THE INVENTION

Embodiments of the invention provide a touch-control method for a liquid crystal display device and a touch-controllable liquid crystal display device, so as to solve the technical problem that the existing touch-control technology goes against a lighter and thinner product and may deteriorate the display effect.

According to a first aspect of the invention, there is provided a touch-control method for a liquid crystal display device, including: switching from a display mode to a touch-control mode; determining whether there is a touch made by an object or whether there is an input made by an active pen; in the case where there is the input made by the active pen, starting an active pen detecting sub-mode in which an X-axis direction common electrode of the liquid crystal display device is defined as an X-axis direction receiving electrode, and a Y-axis direction common electrode or a signal electrode is defined as a Y-axis direction receiving electrode; and determining a position or an action of the active pen according to amplitudes of signals of the X-axis direction receiving electrode and the Y-axis direction receiving electrode.

According to a second aspect of the invention, there is provided a touch-controllable liquid crystal display device, including a thin film transistor (TFT) and a switching electrode for the TFT, a signal electrode and a drain electrode which are connected to the TFT, a pixel electrode connected to the drain electrode, and a common electrode for forming an electric field with the pixel electrode to control whether to display an image, the touch-controllable liquid crystal display device further including a touch-control processor connected to the signal electrode and the common electrode, wherein the touch-control processor includes: a switching unit configured to switch between a display mode and a touch-control mode; a starting unit configured to, in the touch-control mode, determine whether there is a touch made by an object or whether there is an input made by an active pen, and start an active pen detecting unit in the case where there is the input made by the active pen; and the active pen detecting unit configured to define an X-axis direction common electrode of the liquid crystal display device as an X-axis direction receiving electrode, and to define a Y-axis direction common electrode or a signal electrode as a Y-axis direction receiving electrode; and to determine a position or an action of the active pen according to amplitudes of signals of the X-axis direction receiving electrode and the Y-axis direction receiving electrode.

In the embodiments of the invention, a design conception in which the electrodes already present the liquid crystal display are used in a time division multiplex way is applied, so that the liquid crystal display device may switch between the display mode and the touch-control mode. In the display mode, the liquid crystal display device displays normally. In the touch-control mode, the common electrode or the signal electrode that the liquid crystal display device already has is defined as the receiving electrode, so that the touch-control function is achieved. Thereby, the display function and the touch-control function are performed at different times, without increasing the thickness and weight of the liquid crystal display, allowing for a lighter and thinner product. Moreover, both the light transmittance and the display area are not reduced, and thereby the display effect of the liquid crystal display device is not affected.

DETAILED DESCRIPTION OF THE INVENTION

Embodiments of the invention provides a touch-control method for a liquid crystal display device, so as to solve the technical problem that the existing touch-control technology goes against a lighter and thinner product and may deteriorate the display effect. The embodiments of the invention further provide a corresponding touch-controllable liquid crystal display device. The method and the device are described in detail as follows respectively.

First Embodiment

Figure 1:
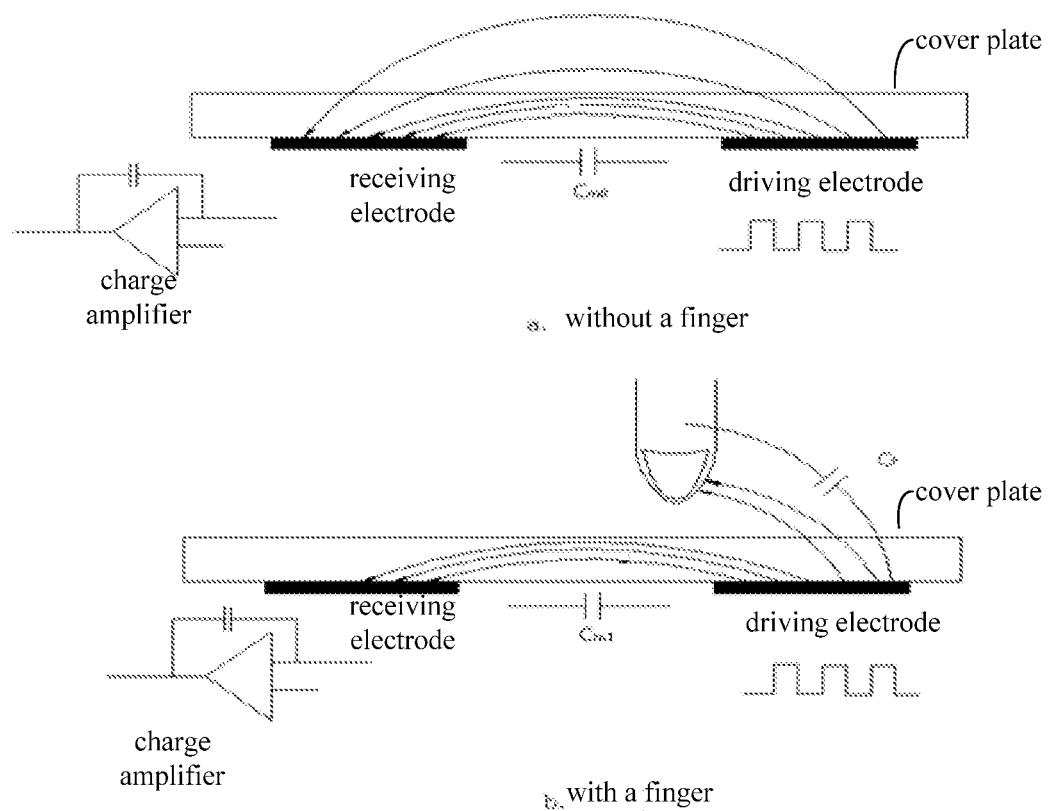
FIG. 1 is a schematic diagram of the mutual capacitance touch sensing technology.
Figure 2:
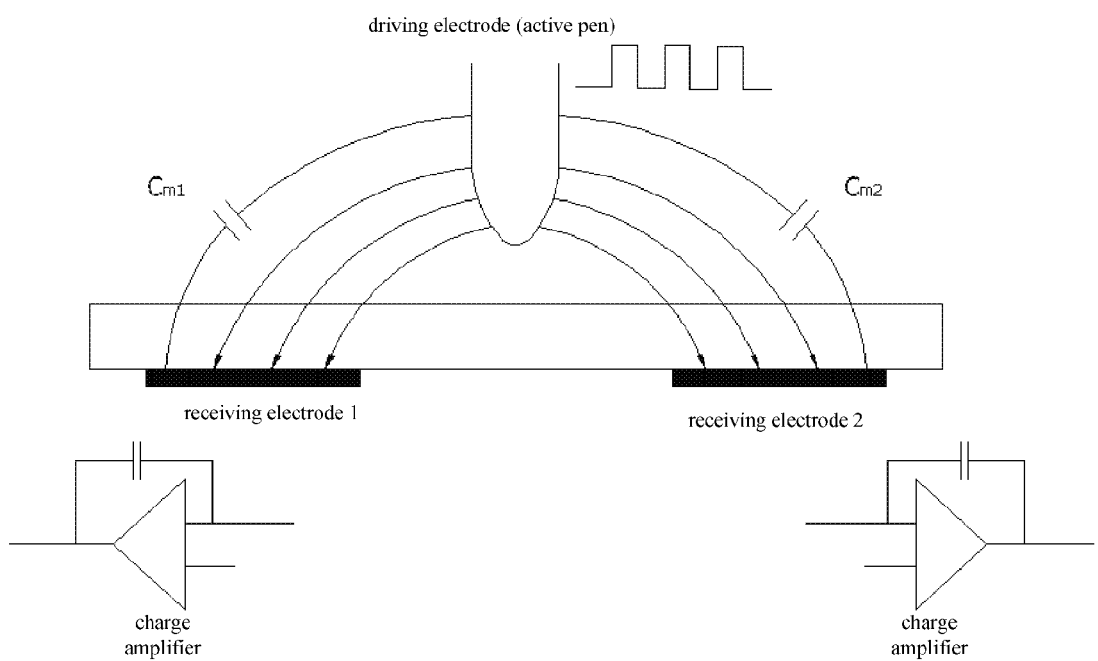
FIG. 2 is a schematic diagram of the active pen input technology.
Figure 3:
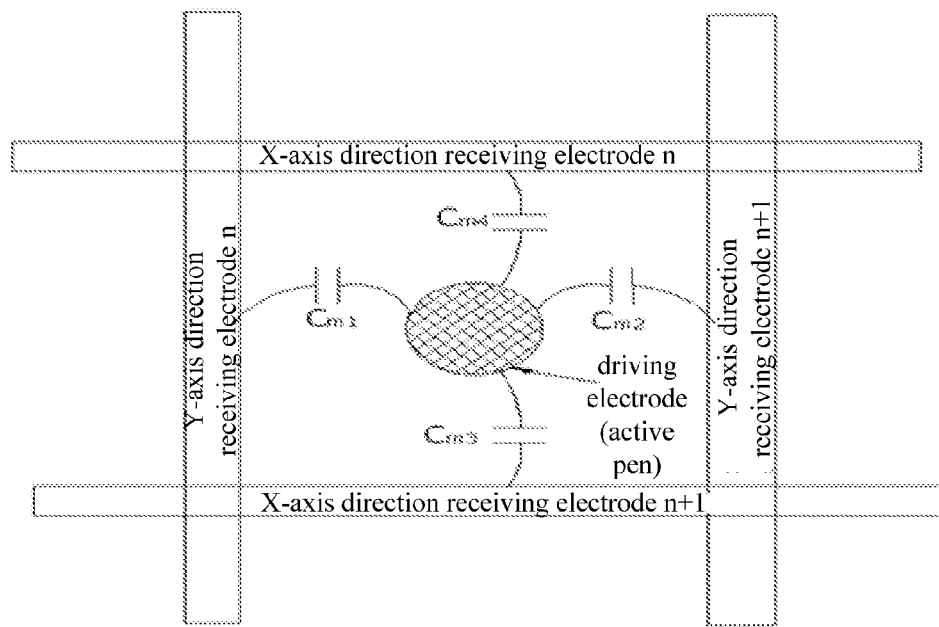
FIG. 3 is another schematic diagram of the active pen input technology.
Figure 4:
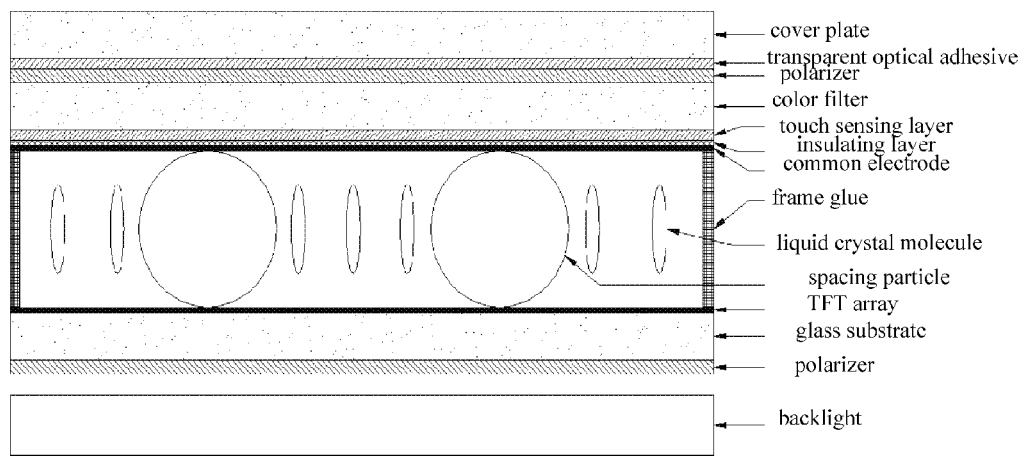
FIG. 4 is a schematic diagram of the In-cell technology.
Figure 5:
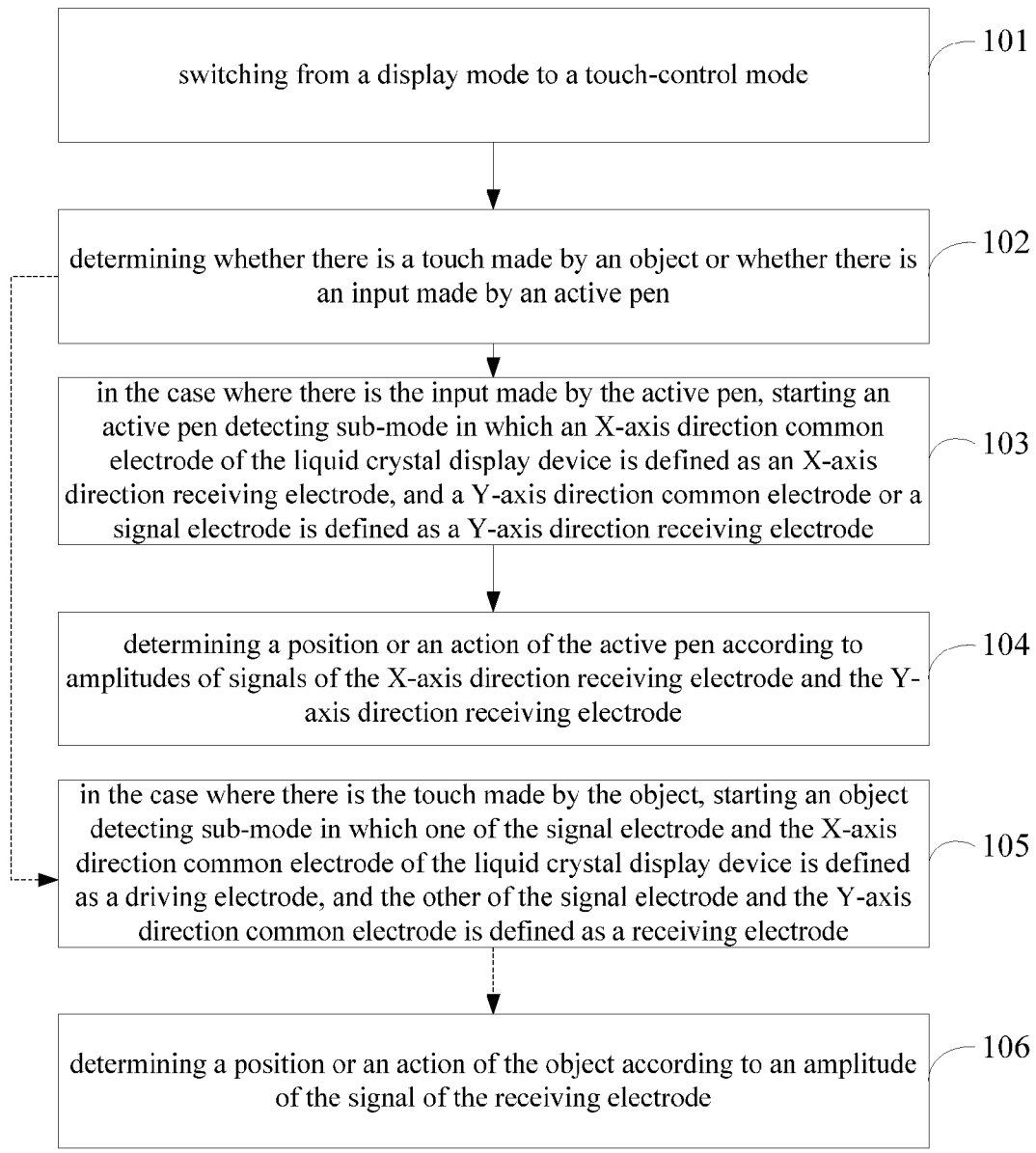
FIG. 5 is a flowchart of a touch-control method for a liquid crystal display device according to an embodiment of the invention.

Referring to FIG. 5, an embodiment of the invention provides a touch-control method for a liquid crystal display device, including Steps 101 to 106.

Step 101: switching from a display mode to a touch-control mode.

In the embodiment of the invention, a design conception in which the electrodes already present in the liquid crystal display are used in a time division multiplex way is employed, so that the liquid crystal display device may have two operation modes, i.e. a display mode and a touch-control mode, one of which can be switched to the other. The liquid crystal display device operates in the display mode after being turned on. Triggered by a preset event, the liquid crystal display device may switch from the display mode to the touch-control mode as required. At the end of the touch or being triggered by a preset event, the liquid crystal display device may switch back to the display mode. The preset event may be an event in which a special button is pressed, an event in which it is detected that an object is getting closer, and so on.

Figure 6:
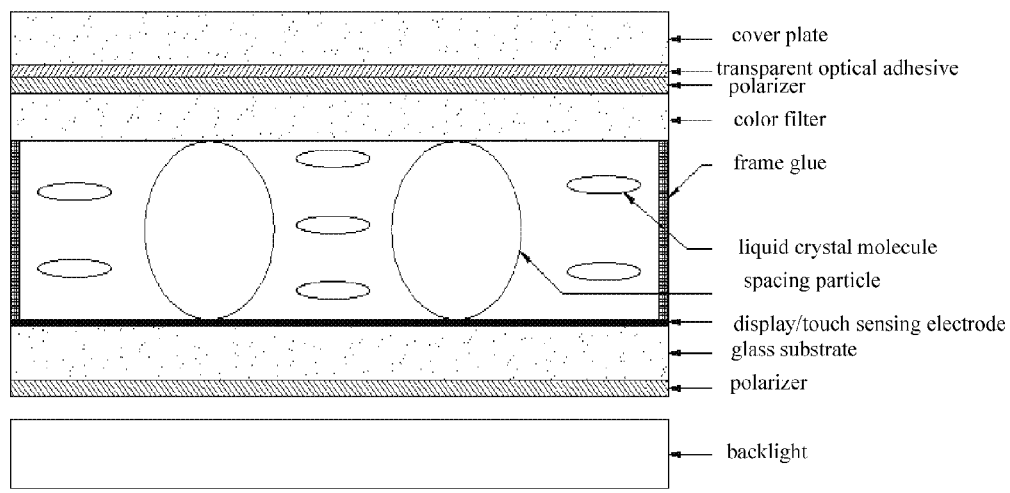
FIG. 6 is a schematic structural diagram of a liquid crystal display device.
Figure 7:
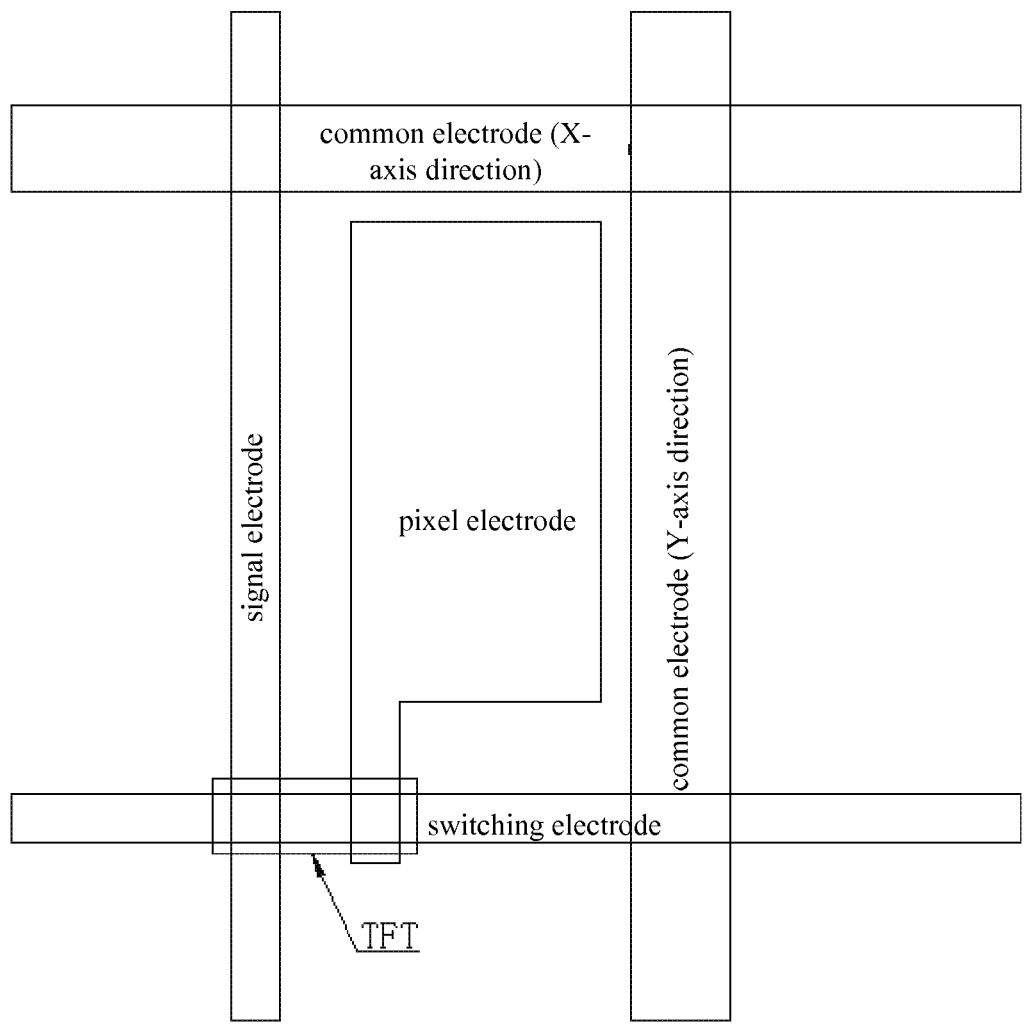
FIG. 7 is a plan view of electrodes of the liquid crystal display device.
Figure 8:
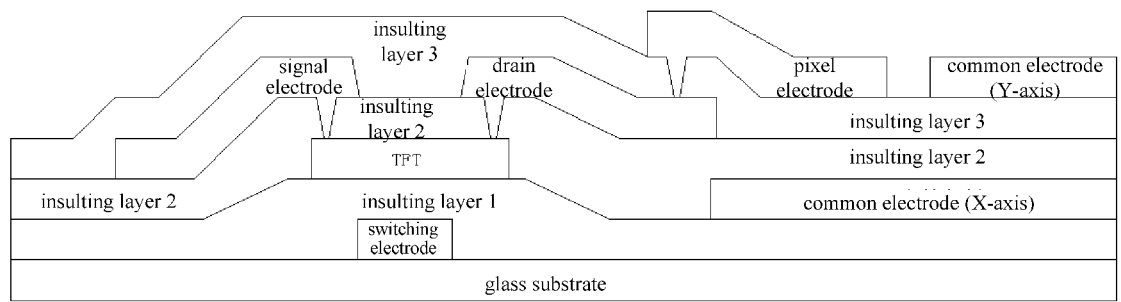
FIG. 8 is a sectional view of the electrodes of the liquid crystal display device.

The operation principle in the display mode is briefly described as follows in conjunction with the structure of the liquid crystal display device shown in the drawings. The liquid crystal display device mainly includes, as shown in FIG. 6, an upper glass substrate, a lower glass substrate and a liquid crystal display box therebetween, as well as a color light filter, an upper polarizer, a lower polarizer, a thin film transistor (TFT) and so on. The electrodes of the liquid crystal display device include, as shown in FIGS. 7 and 8, a switching electrode for controlling the TFT, a signal electrode and a drain electrode which are connected to the TFT, a pixel electrode connected to the drain electrode, a common electrode for forming an electric field with the pixel electrode to control whether to display an image, and so on.

When no voltage is applied and the switching electrode is turned off, the TFT is equivalent to two reverse-biased diodes connected together, and it is impossible for the current of the signal electrode to flow through the TFT to the drain electrode. Since the pixel electrode is connected to the drain electrode, there is no current flowing to the pixel electrode. Therefore, an electric field can not be established between the pixel electrode and the common electrode. In this case, the arrangement of the liquid crystal molecules is the same as the orientating layer. The lights pass through the lower polarizer into the liquid crystal display box and then are transmitted to the upper polarizer according to the arrangement of the liquid crystal molecules. Since the transmitted lights are at an angle of 90° relative to the upper polarizer, the lights are blocked and the liquid crystal display device displays black.

When a voltage is applied and the switching electrode is turned on, the current of the signal electrode flows through the TFT to the drain electrode. In this case, an electric field is established between the pixel electrode and the common electrode, and the liquid-crystal molecules rotate under the influence of the electric field. When the lights pass through the lower polarizer into the liquid crystal display box, the lights may rotate according to the arrangement of the liquid crystal molecules, so that the lights changes from linearly polarized lights to circularly polarized lights or elliptically polarized lights. The circularly polarized lights or the elliptically polarized lights can pass through the upper polarizer, i.e. the lights can pass through the upper polarizer. In cooperation with the three primary colors of red, green and blue of the color light filter and the combination thereof, various colors may be displayed.

The above is the operation principle of a general In-Plane Switching (IPS) liquid crystal display device. The signal of the signal electrode is controlled via the switching electrode to pass through the TFT to the pixel electrode. That is to say, by controlling the electric field to be present or not present between the pixel electrode and the common electrode, the display of an image is controlled.

As may be seen from the above discussion, in the display mode, a voltage is applied to turn on the switching electrode; and in the touch-control mode, the voltage is stopped to be applied to the switching electrode, so that the switching electrode is turned off, so as to implement the switch between the display mode and the touch-control mode.

Step 102: determining whether there is a touch made by an object or whether there is an input made by an active pen.

Given the difference between the touch made by an object and the input made by an active pen, in the touch-control mode, it should be further determined whether there is a touch made by an object or whether there is an input made by an active pen, and different sub-modes are entered accordingly. The step of determining may be performed by a common sensor unit.

Step 103: in the case where there is the input made by the active pen, starting an active pen detecting sub-mode in which an X-axis direction common electrode of the liquid crystal display device is defined as an X-axis direction receiving electrode, and a Y-axis direction common electrode or a signal electrode is defined as a Y-axis direction receiving electrode.

Figure 9:
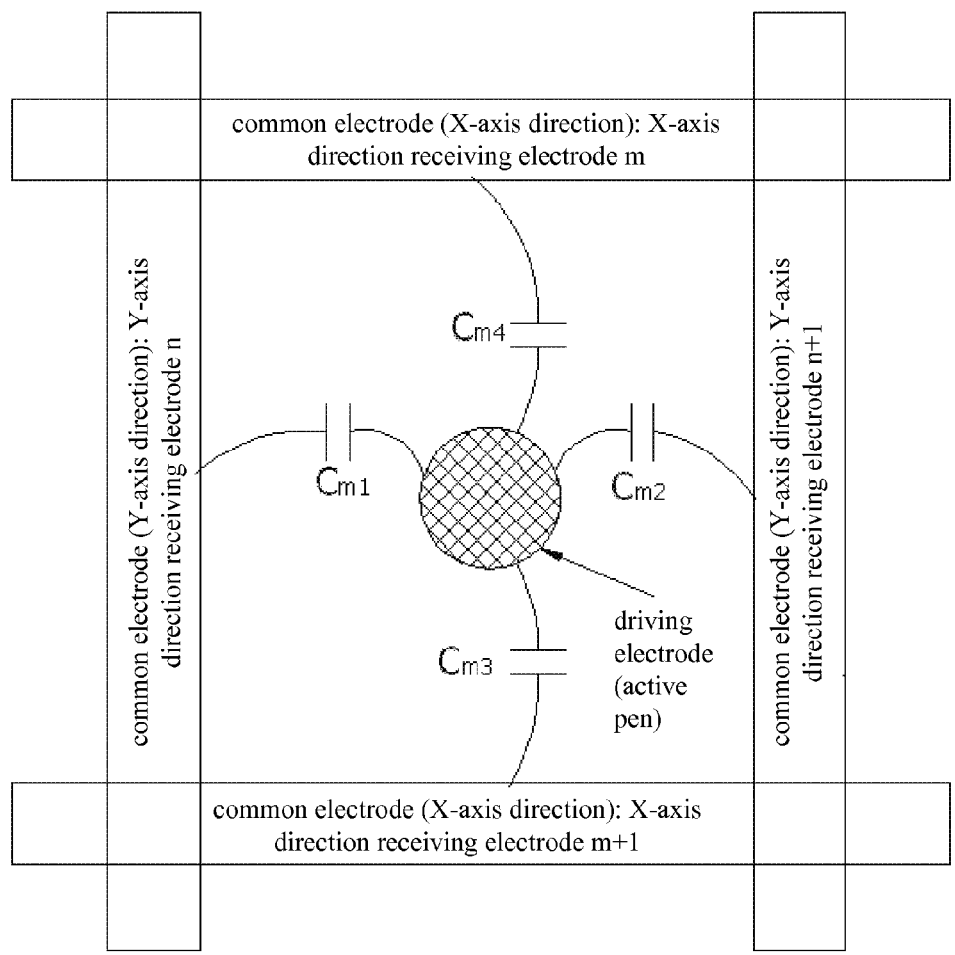
FIG. 9 is a schematic diagram of an active pen detecting sub-mode.

Referring to FIG. 9, in the active pen detecting sub-mode, an X-axis direction common electrode may be defined as an X-axis direction receiving electrode, and a Y-axis direction common electrode may be defined as a Y-axis direction receiving electrode.

Figure 10:
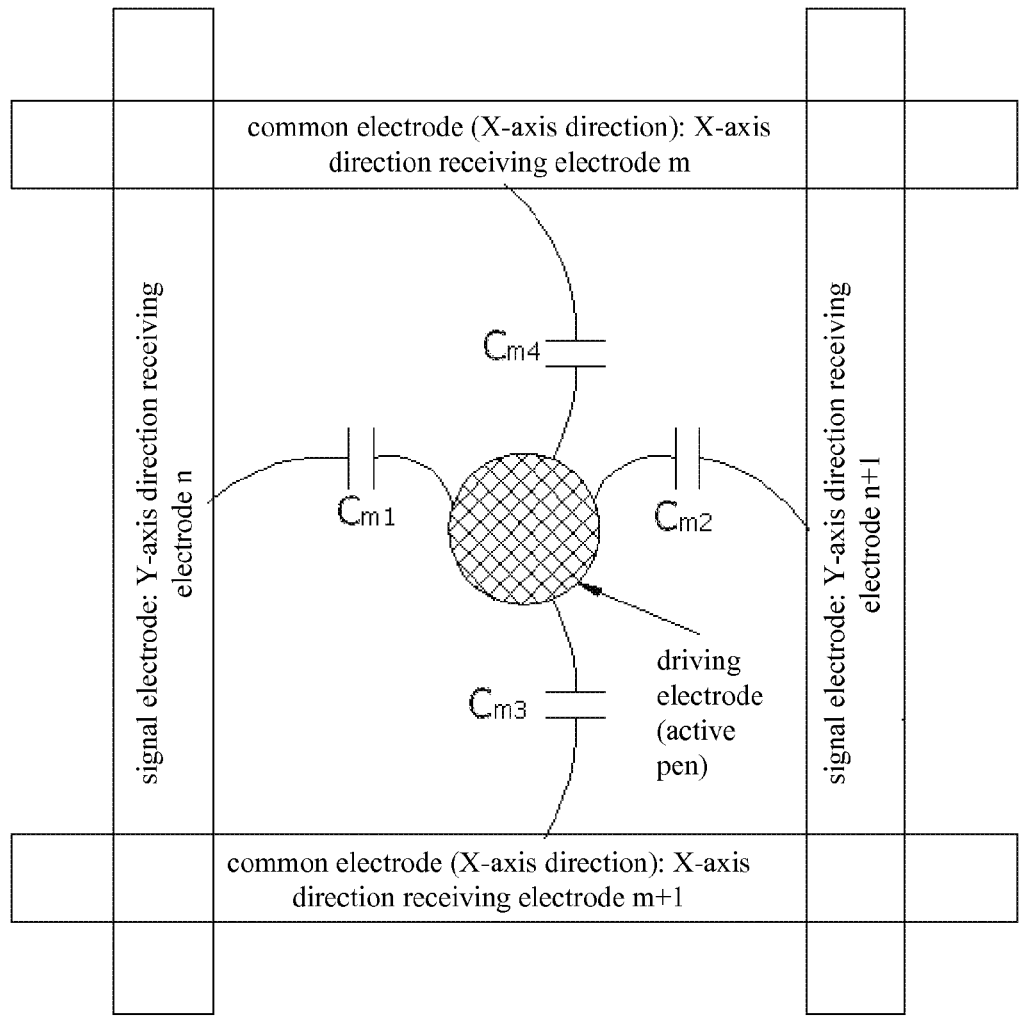
FIG. 10 is another schematic diagram of the active pen detecting sub-mode.

Alternatively, referring to FIG. 10, in the active pen detecting sub-mode, an X-axis direction common electrode may be defined as an X-axis direction receiving electrode, and a signal electrode may be defined as a Y-axis direction receiving electrode.

Figure 11:
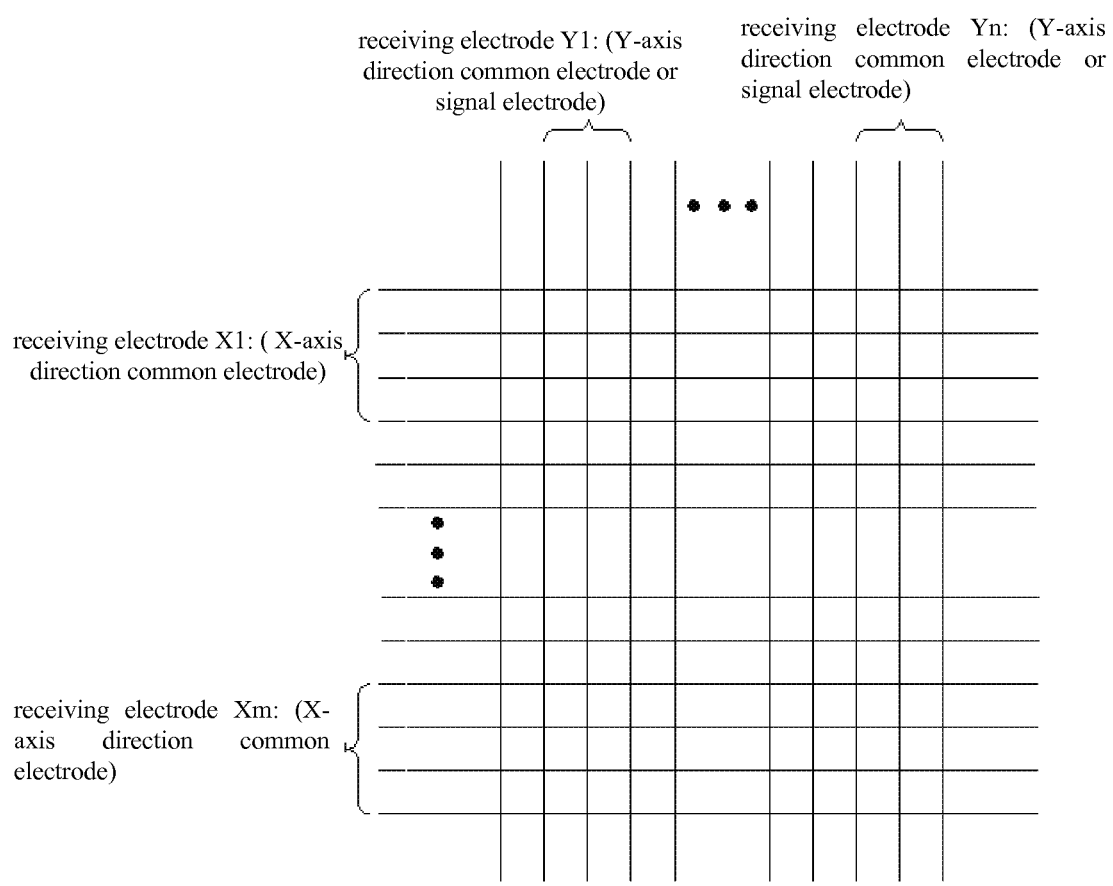
FIG. 11 is yet another schematic diagram of the active pen detecting sub-mode.

In practical application, one X-axis direction common electrode of the liquid crystal display device may be defined as one X-axis direction receiving electrode, and one Y-axis direction common electrode or one signal electrode may be defined as one Y-axis direction receiving electrode. Alternatively, several X-axis direction common electrodes of the liquid crystal display device may be collectively defined as one X-axis direction receiving electrode, and several Y-axis direction common electrodes or several signal electrodes may be collectively defined as one Y-axis direction receiving electrode, as shown in FIG. 11.

Step 104: determining a position or an action of the active pen according to amplitudes of signals of the X-axis direction receiving electrode and the Y-axis direction receiving electrode.

When the active pen emits a driving signal, the position or action of the active pen may be determined according to amplitudes of the signals in the X-axis direction receiving electrode and the Y-axis direction receiving electrode. The determining method may be similar to the touch-control method in the prior art and will not be described herein.

Optionally, after Step 102, the method may further include:

Step 105: in the case where there is the touch made by the object, starting an object detecting sub-mode in which one of the signal electrode and the X-axis direction common electrode of the liquid crystal display device is defined as a driving electrode, and the other of the signal electrode and the Y-axis direction common electrode is defined as a receiving electrode.

Figure 12:
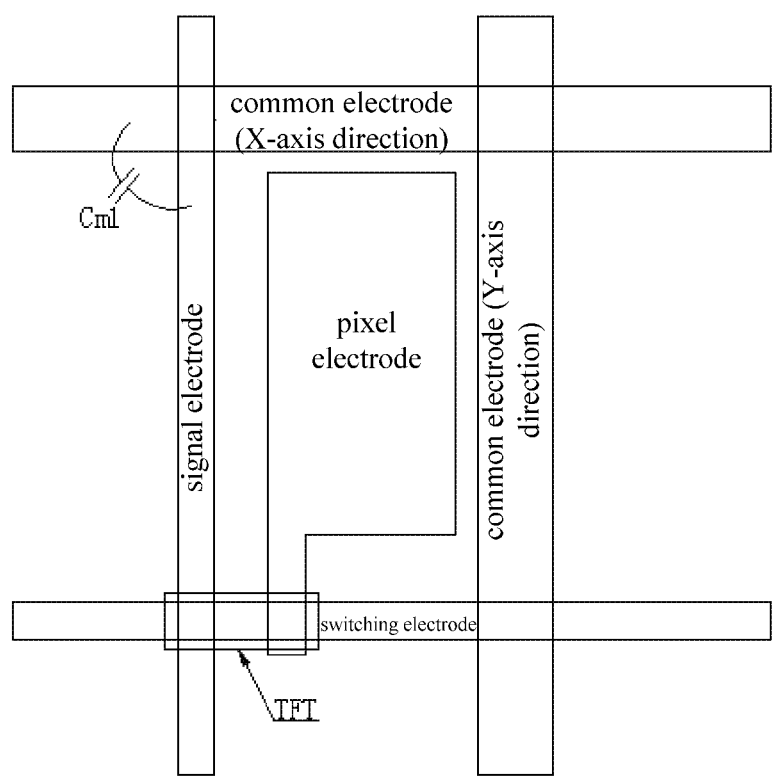
FIG. 12 is a schematic diagram of an object detecting sub-mode.
Figure 13:
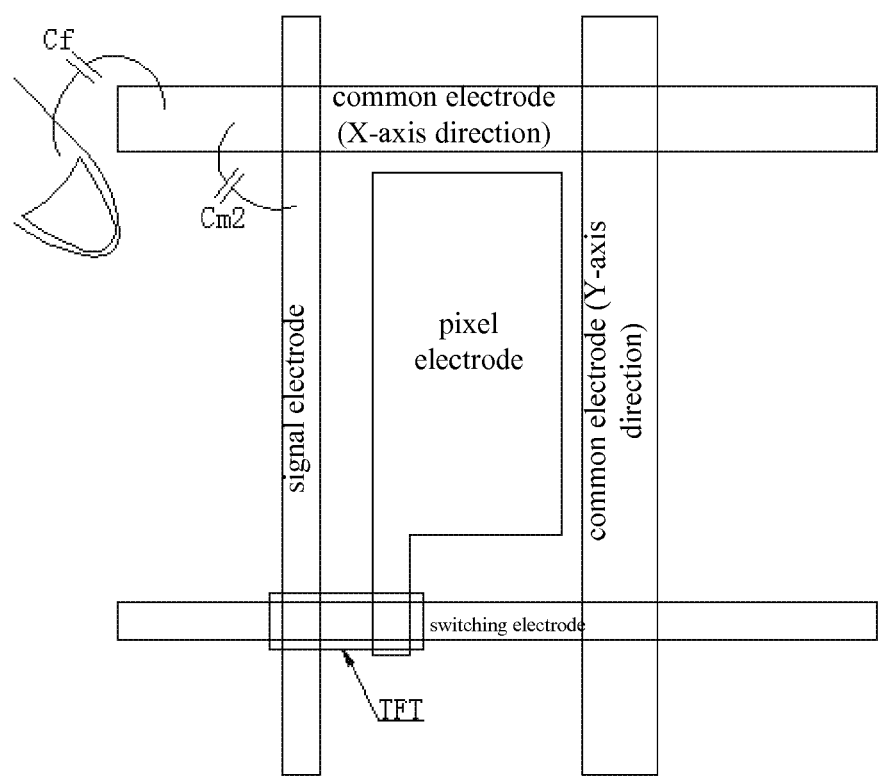
FIG. 13 is another schematic diagram of the object detecting sub-mode.

Referring to FIG. 12, in the object detecting sub-mode, the X-axis direction common electrode may act as the driving electrode and the signal electrode may act as the receiving electrode. In this case, the coupling capacitance between the X-axis direction common electrode and the signal electrode is Cm1. Referring to FIG. 13, when a finger or other conductive object is touching the liquid crystal display device, a coupling capacitance Cf is formed between the driving electrode and the finger or other conductive object, i.e. a part of the signal of the driving electrode is absorbed by the finger or other conductive object. Therefore, in this case, the coupling capacitance Cm2 between the X-axis direction common electrode and the signal electrode is smaller than Cm1. Thus it can be detected whether there is a touch made by an object by detecting the change in the signal of the signal electrode. It should be noted that the signal electrode may be defined as the driving electrode and the X-axis direction common electrode may be defined as the receiving electrode, and the principle is as above.

Figure 14:
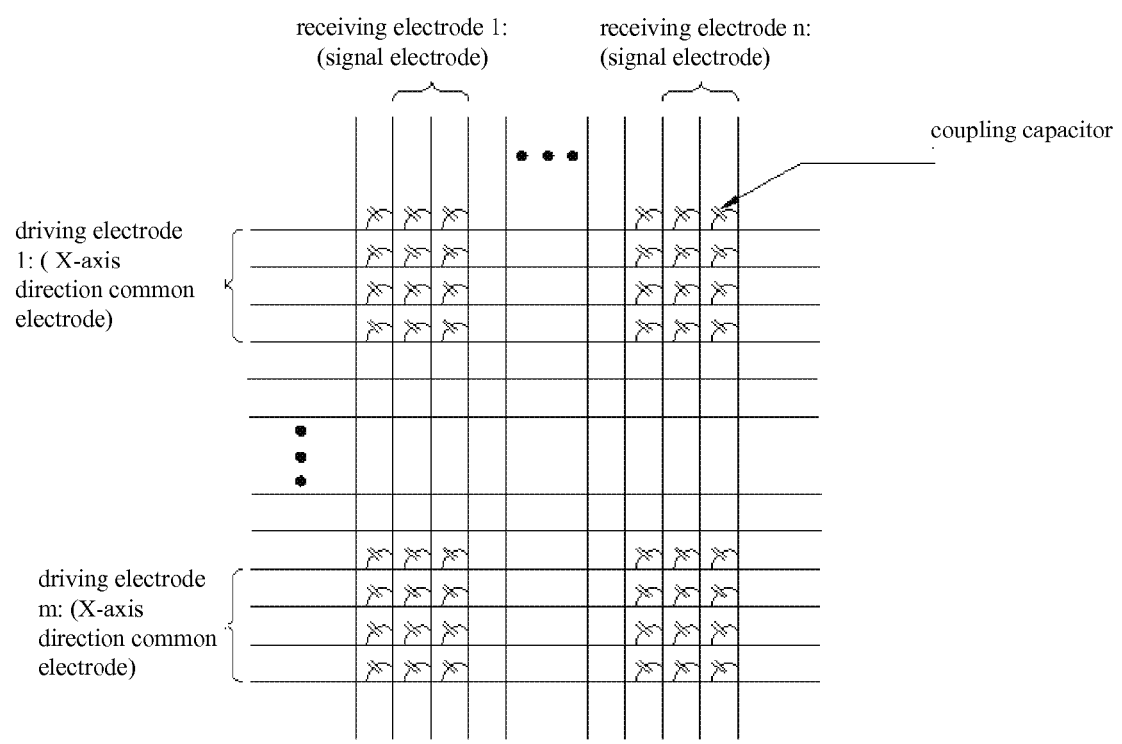
FIG. 14 is yet another schematic diagram of the object detecting sub-mode.
Figure 15:
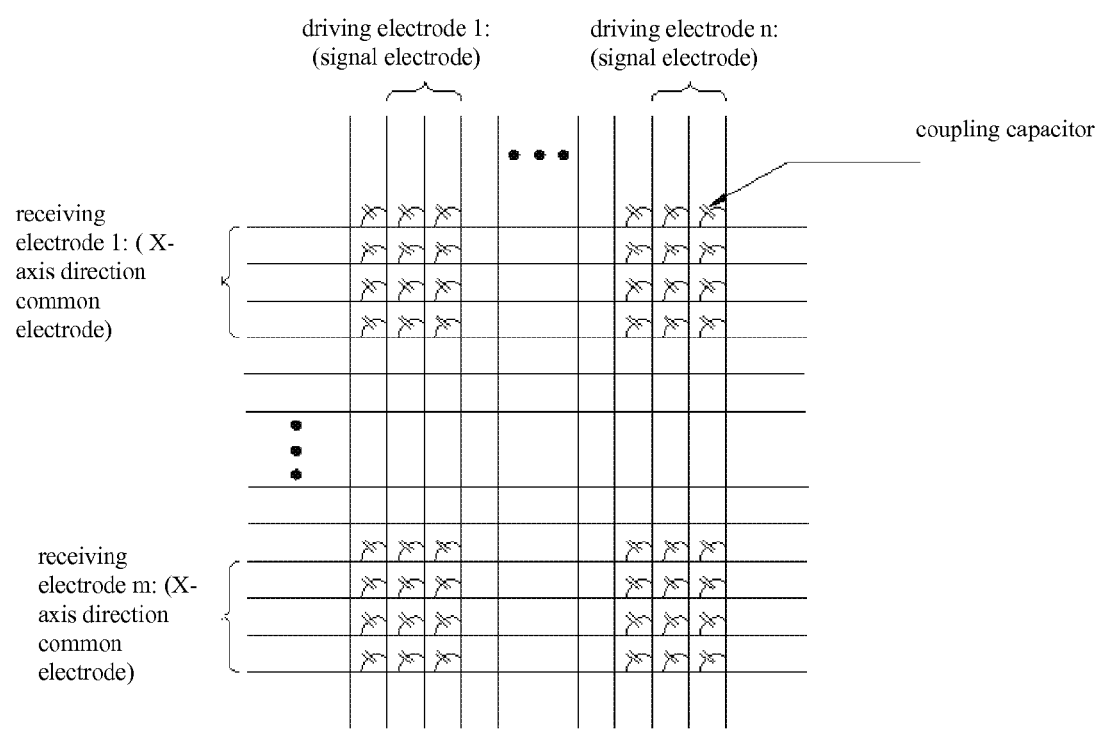
FIG. 15 is still another schematic diagram of the object detecting sub-mode.

In practical application, one or several signal electrodes of the liquid crystal display device may be collectively defined as one driving electrode, and one or several X-axis direction common electrodes may be collectively defined as one receiving electrode, as shown in FIG. 15. Alternatively, one or several X-axis direction common electrodes may be collectively defined as one driving electrode, and one or several signal electrodes may be collectively defined as one receiving electrode, as shown in FIG. 14.

Step 106: determining a position or an action of the object according to an amplitude of the signal of the receiving electrode.

Figure 16:
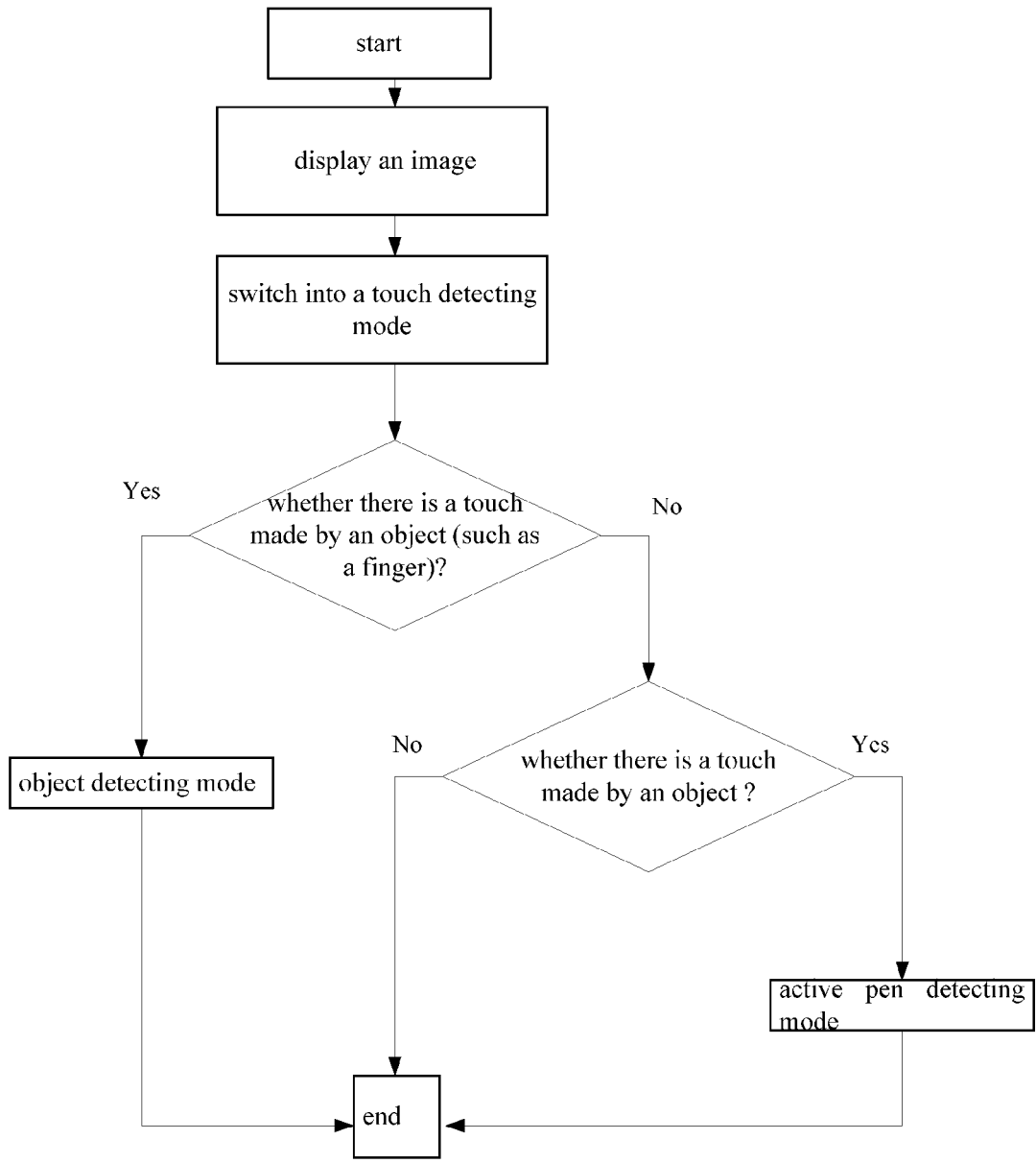
FIG. 16 is a schematic diagram of an application of the invention.

When there is the touch made by the object, the position or action of the object may be determined according to the amplitude of the signal of the receiving electrode. The determining method may be similar to the touch-control method in the prior art and will not be described herein In the following, the method according to the embodiment of the invention is described further in detail by taking a specific application as an example. Referring to FIG. 16, the flowchart of the touch control in the application includes:

starting up, entering into the display mode and displaying the scan of the image;

switching into the touch-control mode as required, the touch-control mode also being referred to as the touch detecting mode;

determining whether there is a touch made by an object such as a finger, and starting the object detecting sub-mode if there is a touch made by an object;

further determining whether there is an input made by an active pen if there is no touch made by the object, and starting the active pen detecting sub-mode if there is the input made by the active pen; otherwise, ending;

in the object detecting sub-mode or the active pen detecting sub-mode, performing detection as described above accordingly; and switching back to the display mode when the detection ends or as required.

In summary, the design conception in which the electrodes already present in the liquid crystal display are used in a time division multiplex way is applied, so that the liquid crystal display device may switch between the display mode and the touch-control mode. In the display mode, the liquid crystal display device displays normally. In the touch-control mode, the common electrode or the signal electrode that the liquid crystal display device already has is defined as the receiving electrode, so that the touch-control function is achieved. Thereby, the display function and the touch-control function are performed at different times, without increasing the thickness and weight of the liquid crystal display, allowing for a lighter and thinner product. Moreover, both the light transmittance and the display area are not reduced, and thereby the display effect of the liquid crystal display device is not affected.

Second Embodiment

Figure 17:
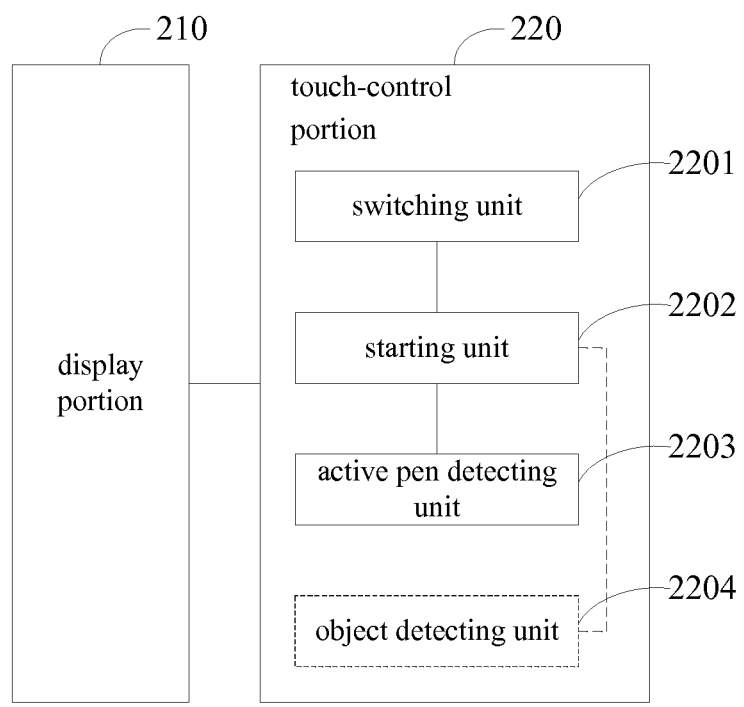
FIG. 17 is a schematic diagram of a touch-controllable liquid crystal display device according to an embodiment of the invention.

Referring to FIG. 17, an embodiment of the invention provides a touch-controllable liquid crystal display device including a display portion 210 and a touch-control portion 220.

As shown in FIGS. 6 to 8, the display portion includes a thin film transistor (TFT) and a switching electrode for the TFT, a signal electrode and a drain electrode which are connected to the TFT, a pixel electrode connected to the drain electrode, a common electrode for forming an electric field with the pixel electrode to control whether to display an image, and so on.

As shown in FIG. 17, the touch-control portion 220 may be a touch-control processor connected to the signal electrode and the common electrode. The touch-control processor may include:

a switching unit 2201 configured to switch between a display mode and a touch-control mode;

a starting unit 2202 configured to, in the touch-control mode, determine whether there is a touch made by an object or whether there is an input made by an active pen, and start an active pen detecting unit in the case where there is the input made by the active pen; and the active pen detecting unit 2203 configured to define an X-axis direction common electrode of the liquid crystal display device as an X-axis direction receiving electrode, and to define a Y-axis direction common electrode or a signal electrode as a Y-axis direction receiving electrode; and to determine a position or an action of the active pen according to amplitudes of signals of the X-axis direction receiving electrode and the Y-axis direction receiving electrode.

Optionally, the touch-control processor may further include an object detecting unit 2204.

The starting unit 2202 is further configured to start the object detecting unit in the case where there is the touch made by the object; and the object detecting unit 2204 is configured to define one of the signal electrode and the X-axis direction common electrode of the liquid crystal display device as a driving electrode, and to define the other of the signal electrode and the Y-axis direction common electrode as a receiving electrode; and to determine a position or an action of the object according to an amplitude of the signal of the receiving electrode.

In summary, the touch-control processor may be used to perform the following Steps as shown in FIG. 5:

Step 101: switching from a display mode to a touch-control mode.

Step 102: determining whether there is a touch made by an object or whether there is an input made by an active pen.

Step 103: in the case where there is the input made by the active pen, starting an active pen detecting sub-mode in which an X-axis direction common electrode of the liquid crystal display device is defined as an X-axis direction receiving electrode, and a Y-axis direction common electrode or a signal electrode is defined as a Y-axis direction receiving electrode.

Step 104: determining a position or an action of the active pen according to amplitudes of signals of the X-axis direction receiving electrode and the Y-axis direction receiving electrode.

Step 105: in the case where there is the touch made by the object, starting an object detecting sub-mode in which one of the signal electrode and the X-axis direction common electrode of the liquid crystal display device is defined as a driving electrode, and the other of the signal electrode and the Y-axis direction common electrode is defined as a receiving electrode.

Step 106: determining a position or an action of the object according to an amplitude of the signal of the receiving electrode.

Figure 18:
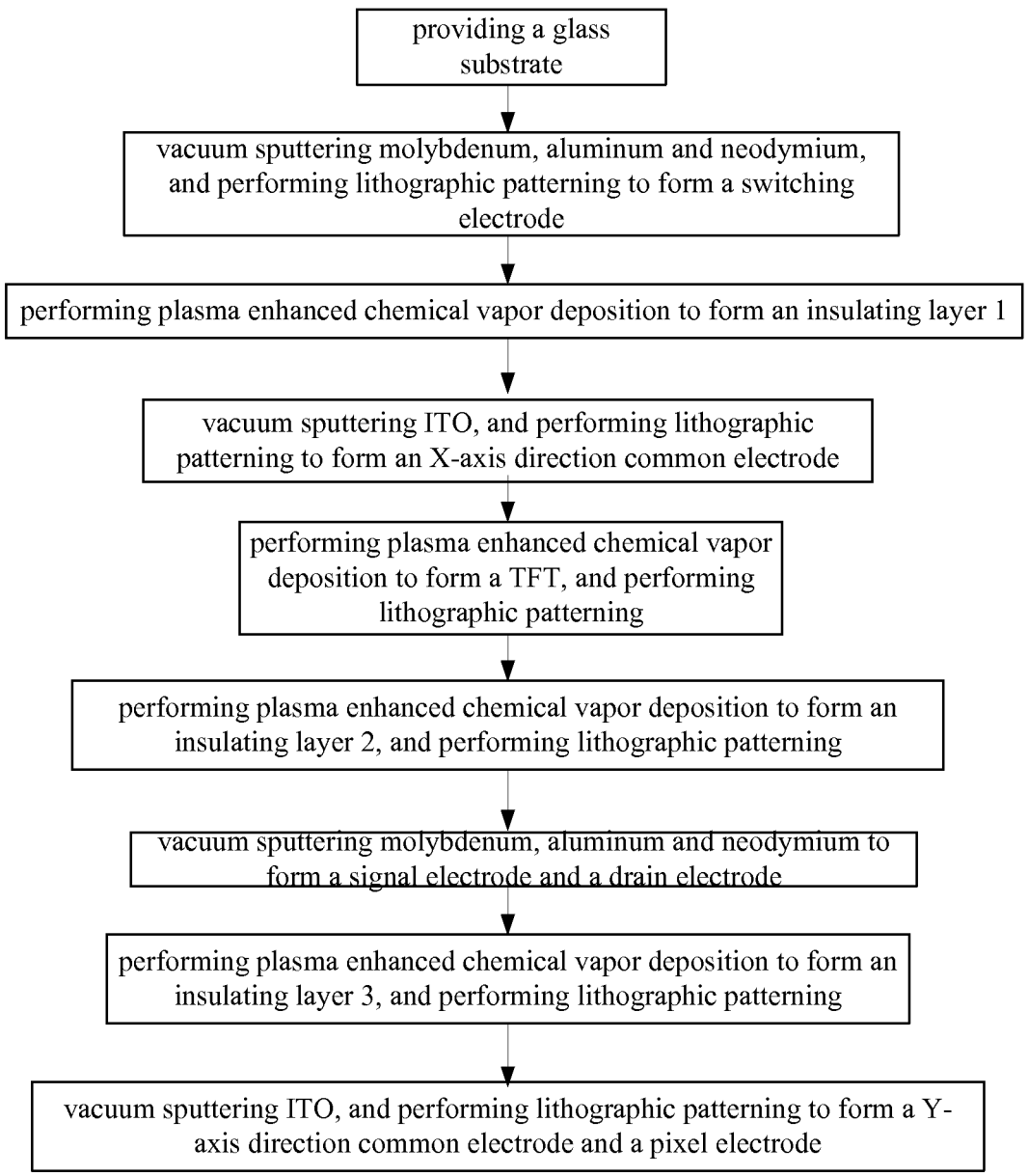
FIG. 18 is schematic diagram of a flowchart for manufacturing a touch-controllable liquid crystal display device.

The embodiment of the invention provides a touch-controllable liquid crystal display device as above. The flowchart for manufacturing the touch-controllable liquid crystal display device may be as shown in FIG. 18, including:

301. providing a glass substrate;

302. vacuum sputtering molybdenum, aluminum and neodymium (Mo-Lv-Nd), and performing lithographic patterning to form a switching electrode;

303. performing plasma enhanced chemical vapor deposition to form an insulating layer 1;

304. vacuum sputtering ITO, and performing lithographic patterning to form an X-axis direction common electrode;

305. performing plasma enhanced chemical vapor deposition to form a TFT, and performing lithographic patterning;

306. performing plasma enhanced chemical vapor deposition to form an insulating layer 2, and performing lithographic patterning;

307. vacuum sputtering molybdenum, aluminum and neodymium to form a signal electrode and a drain electrode;

308. performing plasma enhanced chemical vapor deposition to form an insulating layer 3, and performing lithographic patterning; and 309. vacuum sputtering ITO, and performing lithographic patterning to form a Y-axis direction common electrode and a pixel electrode.

So far, the manufacturing process ends.

In summary, the embodiment of the invention provides the touch-controllable liquid crystal display device, in which the electrodes already present in the liquid crystal display are used in a time division multiplex way, so that the liquid crystal display device may switch between the display mode and the touch-control mode. In the display mode, the liquid crystal display device displays normally. In the touch-control mode, the common electrode or the signal electrode that the liquid crystal display device already has is defined as the receiving electrode, so that the touch-control function is achieved. Thereby, the display function and the touch-control function are performed at different times, without increasing the thickness and weight of the liquid crystal display, allowing for a lighter and thinner product. Moreover, both the light transmittance and the display area are not reduced, and thereby the display effect of the liquid crystal display device is not affected.

It can be understood by the skilled in the art that all or some of the steps in the methods according to the above-mentioned embodiments may be implemented in hardware or may be implemented by instructing related hardware via a program. The program may be stored in a computer-readable storage medium which may include a read-only memory, a random read memory, a magnetic or optical disk, etc.

In the above, the touch-control method for the liquid crystal display device and the touch-controllable liquid crystal display device according to the embodiments of the invention are described in detail. However, the description of the above-mentioned embodiments is only for helping understanding the method and core conception of the invention and should not be construed as limiting the invention. Any of the other changes and substitutions obtained by those skilled in the art in light of the technical scope disclosed in the present invention without any creative work falls in the scope of protection of the present invention.

The invention claimed is:

1. A touch-control method for a liquid crystal display device, comprising:

switching from a display mode to a touch-control mode;

determining whether a touch is made by an object or whether an input is made by an active pen;

in the case where the input is made by the active pen, starting an active pen detecting sub-mode in which an X-axis direction common electrode of the liquid crystal display device is defined as an X-axis direction receiving electrode and a Y-axis direction common electrode or a signal electrode is defined as a Y-axis direction receiving electrode; and determining a position or an action of the active pen according to amplitudes of signals of the X-axis direction receiving electrode and the Y-axis direction receiving electrode.

2. The method according to claim 1, wherein after determining whether a touch is made by an object or whether an input is made by an active pen, the method further comprises:

in the case where the touch is made by the object, starting an object detecting sub-mode in which one of the signal electrode and the X-axis direction common electrode of the liquid crystal display device is defined as a driving electrode and the other of the signal electrode and the Y-axis direction common electrode is defined as a receiving electrode; and determining a position or an action of the object according to an amplitude of the signal of the receiving electrode.

3. The method according to claim 2, wherein in the active pen detecting sub-mode, the defining an X-axis direction common electrode of the liquid crystal display device as an X-axis direction receiving electrode and the defining a Y-axis direction common electrode or a signal electrode as a Y-axis direction receiving electrode comprise:

in the active pen detecting sub-mode, defining one X-axis direction common electrode of the liquid crystal display device as one X-axis direction receiving electrode, and defining one Y-axis direction common electrode or one signal electrode as one Y-axis direction receiving electrode;

or defining several X-axis direction common electrodes of the liquid crystal display device collectively as one X-axis direction receiving electrode, and defining several Y-axis direction common electrodes or several signal electrodes collectively as one Y-axis direction receiving electrode.

4. The method according to claim 2, wherein in the object detecting sub-mode, the defining one of the signal electrode and the X-axis direction common electrode of the liquid crystal display device as a driving electrode and the defining the other of the signal electrode and the Y-axis direction common electrode as a receiving electrode comprise:

in the object detecting sub-mode, defining one or several signal electrodes of the liquid crystal display device collectively as one driving electrode, and defining one or several X-axis direction common electrodes collectively as one receiving electrode;

or defining one or several X-axis direction common electrodes collectively as one driving electrode, and defining one or several signal electrodes collectively as one receiving electrode.

5. The method according to claim 2, further comprising:
switching from the touch-control mode to the display mode as required.

6. The method according to claim 1, wherein in the active pen detecting sub-mode, the defining an X-axis direction common electrode of the liquid crystal display device as an X-axis direction receiving electrode and the defining a Y-axis direction common electrode or a signal electrode as a Y-axis direction receiving electrode comprise:

in the active pen detecting sub-mode, defining one X-axis direction common electrode of the liquid crystal display device as one X-axis direction receiving electrode, and defining one Y-axis direction common electrode or one signal electrode as one Y-axis direction receiving electrode;

or defining several X-axis direction common electrodes of the liquid crystal display device collectively as one X-axis direction receiving electrode, and defining several Y-axis direction common electrodes or several signal electrodes collectively as one Y-axis direction receiving electrode.

7. The method according to claim 1, wherein in the object detecting sub-mode, the defining one of the signal electrode and the X-axis direction common electrode of the liquid crystal display device as a driving electrode and the defining the other of the signal electrode and the Y-axis direction common electrode as a receiving electrode comprise:

in the object detecting sub-mode, defining one or several signal electrodes of the liquid crystal display device collectively as one driving electrode, and defining one or several X-axis direction common electrodes collectively as one receiving electrode;

or defining one or several X-axis direction common electrodes collectively as one driving electrode, and defining one or several signal electrodes collectively as one receiving electrode.

8. The method according to claim 1, further comprising:
switching from the touch-control mode to the display mode as required.

9. A touch-controllable liquid crystal display device, comprising a thin film transistor TFT and a switching electrode for the TFT, a signal electrode and a drain electrode which are connected to the TFT, a pixel electrode connected to the drain electrode, and a common electrode for forming an electric field with the pixel electrode to control whether to display an image, the touch-controllable liquid crystal display device further comprising a touch-control processor connected to the signal electrode and the common electrode, wherein the touch-control processor comprises:

a switching unit configured to switch between a display mode and a touch-control mode;

a starting unit configured to, in the touch-control mode, determine whether a touch is made by an object or an input is made by an active pen, and start an active pen detecting unit in the case where the input is made by the active pen; and the active pen detecting unit configured to define an X-axis direction common electrode of the liquid crystal display device as an X-axis direction receiving electrode, and to define a Y-axis direction common electrode or a signal electrode as a Y-axis direction receiving electrode; and to determine a position or an action of the active pen according to amplitudes of signals of the X-axis direction receiving electrode and the Y-axis direction receiving electrode.

10. The touch-controllable liquid crystal display device according to claim 9, wherein:

the starting unit is further configured to start an object detecting unit in the case where the touch is made by the object; and the object detecting unit is configured to define one of the signal electrode and the X-axis direction common electrode of the liquid crystal display device as a driving electrode, and to define the other of the signal electrode and the Y-axis direction common electrode as a receiving electrode; and to determine a position or an action of the object according to an amplitude of the signal of the receiving electrode.

* * * * *